Figure 1:
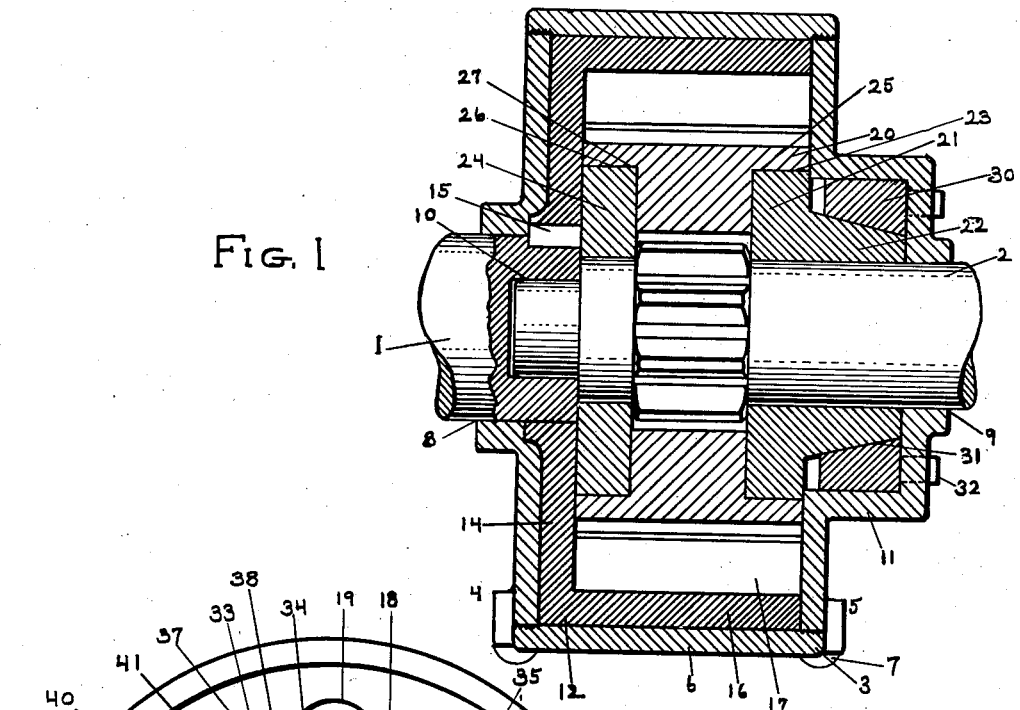

Nov. 28, 1939.  W. W. ZAENGER  2,181,162

POWER TRANSMISSION

Filed April 12, 1937

Inventor
William W. Zaenger
By
Attorney

Patented Nov. 28, 1939

2,181,162

UNITED STATES PATENT OFFICE 2,181,162

POWER TRANSMISSION

William W. Zaenger, Toledo, Ohio

Application April 12, 1937, Serial No. 136,235

11 Claims. (Cl. 74—289)

My invention relates to the transmission of power from a source thereof to a machine element for doing work. The invention particularly relates to a power transmission by means of which a continuous torque force may be transmitted from a driving element to a driven element at a ratio of one to one or more and in a direction common with that of the applied torque force.

My invention has for an object to provide a power transmission means to which a torque of a given magnitude may be applied in one direction to produce a torque in the same direction which varies automatically in magnitude with the measure of resistance or load acted upon by said produced torque, within certain predetermined limitations. Thus, the invention provides a means whereby the mechanical advantage existent between the applied force and working force varies automatically with changing extraneous resistance to the utilization of the working force.

A further object of my invention is to provide a torque power transmission means to which a torque of a given magnitude may be applied in one direction to produce a torque in the same direction at any of a variety of magnitudes, within certain predetermined limitations. The invention further provides means for controllably varying the delivered power, within said limitations, notwithstanding the continued application of power to the power transmission at a constant given magnitude to obtain desired mechanical advantage of any varying degree.

The invention has for another object to provide a pair of rotatable power transmission elements, each having means for effecting an interengagement, whereby a single continuous rotation of one element in one direction will cause a single continuous rotation of the other element in the same direction about an axis, an endwise projectional line of which intersects a radial line of the first-named element at a point between its axis and perimeter.

The invention has for a particular object to provide an annular rotatable element and an internesting second annular element rotatable about an axis extending toward and through the space bounded by the first annular element, each element having interengaging means whereby a single continuous rotation of one element in one direction will positively cause a single continuous rotation of the other element in the same direction. The invention may, therefore, be embodied in a vehicle drive transmission and have the elements located in nesting or telescopic relation with a resultant reduction of space occupancy and other advantages of consideration which will appear more fully hereinbelow from the description of the structure selected to illustrate an embodiment of my invention.

My invention has for a further particular object to provide a power transmission including a pair of gear-like elements rotatable about closely disposed respective axes, each element having a serpentine surface forming alternately disposed involute or arcuate faced teeth and convolute or arcuate shaped lands and adapted to engage a like surface formed on the other element. A further particular object of the invention is to provide a power transmission including interengaging gear-like elements, each having arcuate faced teeth adapted to engage arcuate faced teeth of the other, the radii of the arcuate faces of the first-named teeth being of the same length as the radii of the arcuate faces of the second-named teeth. A still further and more particular object of the invention is to provide a power transmission comprising a pair of gear-like rotatable elements, each having alternately disposed arcuate faced teeth and reverse arcuate shaped lands, the axes of rotation of said elements and the disposition of said teeth and adjacent lands so related that the arc axes of the faces of teeth adapted to respectively engage and the arc axes of lines defining lands adjacent thereto vary in relative position with respect to each other but remain in constant dimensional relation to each other throughout the rotation of the elements. In the provision of said interengaging surfaces, the invention provides a power transmission that operates with a minimum of sound and friction.

The invention consists in other features and advantages which will appear from the following description and upon examination of the drawing. Structures containing the invention may partake of different forms and still embody the invention. To illustrate a practical application of the invention, I have selected a power transmission as an example of the various structures and details thereof that contain the invention and shall describe the selected power transmission hereinafter, it being understood that variations may be made without departing from the spirit of the invention. The particular power transmission selected is shown in the accompanying drawing and described hereinafter.

Figure 2:
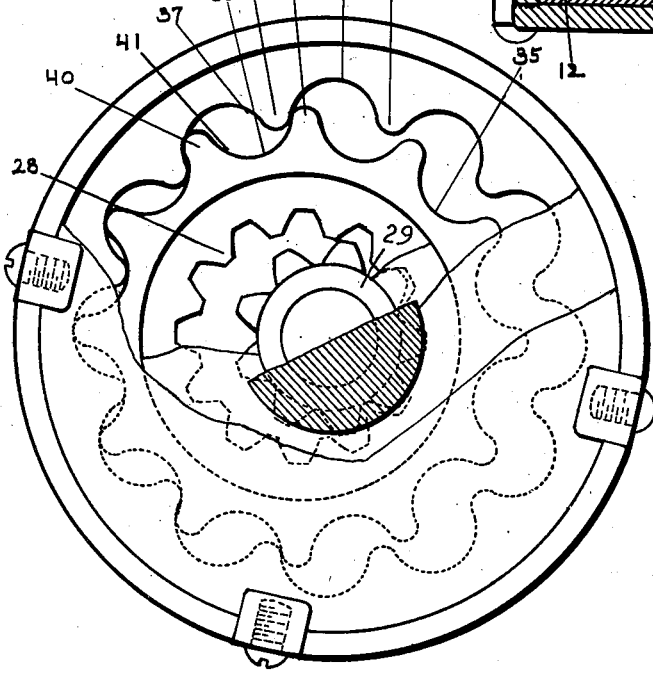

Fig. 1 of the accompanying drawing illustrates a view of a longitudinal section of the power transmission selected for purposes of illustration. Fig. 2 illustrates an end view of the power transmission shown in Fig. 1, portions thereof being shown broken away to better illustrate the parts thereof.

This application is a continuation in part being directed in part to subject matter claimed and disclosed in my co-pending application, Serial No. 19,151, for a Power transmission.

The construction illustrated in the accompanying drawing is adapted for use as a vehicle overdrive transmission and has a driving shaft 1 to which power may be applied and which is connected by a power transmission, embodying my invention, to a driven shaft 2 for delivering power for performing work. The transmission may be housed in a stationary drum or housing 3, of which end plates 4 and 5 and a rim 6, interjoined by suitable bolts 7, form a substantial part. The end plate 4 has a lipped opening 8 through which the shaft 1 may extend. The end plate 5 has a boss portion 11 having an opening 9, axially concentric with the opening 8, through which the shaft 2 may extend. The shaft 2 may extend into a cored recess 10 formed in the housed end of the shaft 1, which recess may serve as an end bearing for the driven shaft 2.

A driving element 12 of the power transmission is connected to the end of the driving shaft 1 which extends into the housing 3. Said driving element may have a web or hub portion 14 that may be keyed to the shaft 1, as shown at 15. The hub portion 14 has a cylindrical rim flange 16, the axis of which is common with that of the housing rim 6. Said housing rim 6 provides a bearing on which the flange 16 moves during rotation of the shaft 1. The inner annular surface 17 of said rim flange, when viewed endwise with respect to the element 12, has a serpentine appearance having a plurality of equally spaced, arcuately faced teeth 18, extending radially toward the axis of rotation of said driving element and having an arcuately shaped land 19 interspersed between each pair of adjacent teeth. The arcuate face of each tooth 18 may be described as involute or inversely arcuate and the arcuate shape of each land 19 may be described as convolute or conversely arcuate all with respect to the cylindricity of the body of the flange 16.

A driven element 20 is preferably disposed in nesting relation to the flange 16 to thereby minimize the space occupied by the transmission parts. The element 20 is preferably of cylindrical form having a depth substantially equal to that of the cylindrical rim flange 16 and a diameter less than that of said flange. Means are provided for supporting the element 20 for rotatable movement about its own axis and lateral or angular movement about the axis of the shaft 2 within the housing 3 and for transmitting its movements to the driven shaft 2. The means for supporting the element 20 for rotatable and lateral angular movements, in the selected structure herein described, is embodied in a discular bearing 24. The bearing 24 is supported on the shaft 2 so as to permit relative angular movements therebetween. The bearing 24 has a cylindrical bearing surface 26, the axis of which is spaced from and eccentric to the axis of rotation of the driven shaft 2 and the driving element 12. Preferably, to further minimize the space occupied by respective parts, the element 20 has a rabbet groove 27 in which the bearing 24 is adapted to be received, the groove surface and bearing surface 26 operating to guide the rotation of the element 20 about its own axis. Thus, the rotation of the driven element 20 will be directed about an axis spaced from the axis of rotation of the driving element.

The spacial relation existing between the respective axes of rotation of the driving and driven elements is a critical one and is related to the particular disposition of other parts of the transmission as hereinafter described. In no event, however, should the axes of the respective elements be displaced from each other a greater distance than one in which a line projected endwise from the axis of the driven element intersects a radial line of said driving element at a point between the axis and the substantial dedundum line of the gear-like surface 17 of the said driving element.

The lateral or angular movement of the element 20, with reference to the axis of the shaft 2, is defined to a predetermined path with reference to the shaft 2 and the driving element 12 by the bearing 24. Said path may be described as of a planetary characteristic in that the element is moved during said lateral movement in an orbit about the axis of the shaft 2. The said orbit is defined as having a diameter such that the point of axial rotation of the element 20 is equidistant from the point of axial rotation of the shaft 2 in all phases of the orbit's cycle. During said lateral or angular movement of the element 20, the bearing 24 may be said to float, its movement being caused by the combined forces acting on and through the element 20 and its function being to direct the resultant of said forces to advantageous purposes, as described hereinafter, and to prevent movement of the element from the path of the aforesaid orbit.

The means for transmitting the movement of the driven element 20 to the driven shaft 2 is provided, in the herein described structure, by a gear connection. Preferably, the element 20 is broached to form internal teeth 28 which mesh with the teeth of a pinion 29 suitably keyed to the shaft 2. The addendum circle of the internal gear formed by the teeth 28 has its axis in common with the axis of rotation of the element 20.

It is within the contemplation and provisions of the invention, that a means be provided, by reason that the element 20 may move laterally or angularly about the axis of the shaft 2 during rotation of the driving element 12, to thus produce subsequent changes in relative position of the axis of rotation of the element 20 with respect to the axis of the shaft 2, whereby the power delivered may vary in its ratio to the power applied to the transmission within certain predetermined limitations. When the element 20 moves laterally or angularly for 360° about the axis of the driven shaft 2 in one direction, the pinion 29 completes a single rotation in said direction. When, however, the element 20 is held against lateral movement, and rotates about its own axis for 360° in one direction, the pinion completes one or more rotations in said direction, depending on the velocity ratio between the teeth of the pinion and element. Hereinafter, a means is described for controlling the lateral or angular movement of the element 20 to locate the axis of rotation of the element in any desired one of a variety of relative positions with respect to the axis of the shaft 2 or for permitting intermittent lateral movement of the element to obtain graduated mechanical advantage within the limitations of said teeth relation.

The diameter of the pinion 29 is consequently so related to the diameter of the internal gear formed by the teeth 28 that the pinion teeth remain in mesh with the teeth 28 notwithstanding lateral movements or changes in relative position that the element 20 assumes with respect to the axis of the shaft 2. In the particular form shown in the drawing, assuming that, during a single rotation of the element 12, the element 20 does not move laterally and remains in one relative position with respect to the axis of the shaft 2, said single rotation will cause one and one-third rotations of the shaft 2. However, if, during said single rotation of the element 12, the element 20 moves laterally from one relative position with respect to the axis of the shaft 2 to another, said single rotation will cause one plus, within the limitation of one and one-third, rotations of the shaft 2.

Means may be provided for allocating or controlling the changes in the relative position or lateral movement of the element 20 with respect to the axis of the shaft 2 to produce, in a single rotation of the element 20 in one direction, a single rotation or a single rotation plus of the pinion 29 in the same direction to the full capacity of the relation between the element teeth 28 and the teeth of said pinion, namely, as in the illustrated structure, from one to one and one-third. Thus, mechanical advantage of a varied degree may be obtained by said control means in accordance with the effects desired to be produced. In the construction illustrated herein, a bearing shoe 21, having a trunnion portion 22 of a truncated conical shape that extends into the boss 11 of the end plate 5 is provided. The shoe 21 is supported on the shaft 2 as to permit respective angular movement therebetween. The shoe has a cylindrical bearing surface 23, the axis of which is common to the axis of the bearing 24 being spaced from the axis of the shaft 1 an equal distance. The shoe 21 is adapted to engage the element 20 and is preferably adapted to be received in a rabbet groove 25 to thus minimize the space occupied thereby. Any suitable means may be provided for retarding or locking the trunnion portion against rotation relative to the boss 11 and thus controlling the lateral movement or changes in relative position of the element 20 to the axis of the shaft 2. Preferably, a collar 30 is provided, the outside diameter of which is adapted to slidably fit the interior of the boss 11. The collar 30 has an inner surface 31 that approximates and may engage the surface of the trunnion. Suitable means, such as the pins 32 which slidably extend through openings in the end plate 5 and which are connected to the collar 30, may be provided for moving the collar 30 relative to the boss 11. Thus, when the pins 32 are pressed inwardly with respect to the housing 3, the collar 30 is moved to a wedging relation as between the walls of the boss 11 and the surface of the trunnion 22 retarding and/or locking the trunnion against rotation with reference to said housing and, consequently, controlling the movement of the shoe 21 with reference to the axis of rotation of the shaft 2.

In order to positively connect the element 20 to the driving element 12 so that a single rotation of the driving element in one direction will produce a corresponding single rotation of the driven element in the same direction, the driven element has a perimetrical gear-like surface 33. The surface 33, when viewed endwise with respect to the driving element, has a serpentine appearance having a plurality of equally spaced, arcuately faced teeth 34, extending radially away from the axis of rotation of said driving element and having an arcuately shaped land 35 interspaced between each pair of adjacent teeth. The arcuate face of each tooth 34 has a radius equal to the radius of the arcuate face of each tooth 18 and may be described as involute or inversely arcuate and a line, describing the arcuate shape of each land 35, has a radius equal to the radius of a line describing the arcuate shape of each land 19 and may be described as convolute or conversely arcuate with respect to the cylindricity of the body of the element 20.

The teeth 34 are each so disposed on the element 20 that the axis or center, indicated at 37, of an arcuate line describing its adjoining land 35 is equidistant from the axis or center, indicated at 38, of the arcuate face of a tooth 18 on the driving element 12 adapted to engage said tooth 34 and so that the axis or center, indicated at 40, of the arcuate face of the tooth 34 is equidistant from the axis or center, indicated at 41, of an arcuate line describing a land 19 on the driving element 12 adjoining the said particular tooth 18 engaged or adapted to be so engaged. The above described relation of centers subsists notwithstanding rotation of the elements 12 and 20 or movement of the bearing shoe 21 to direct rotation of the element 20 about an axis of different center than that existent before said bearing shoe movement. It will be noted further in the disposition of said teeth 34, that the distances between said above described centers 37 and 38 and the centers 40 and 41 is equal to the distance between the axial centers of rotation of the elements 12 and 20. Thus, the shafts 1 and 2 are maintained in a relation of rigid interconnection in the sense that some relation of motion transmission exists between the shafts at all times. This relation may be otherwise described as one in which uncompromising inflexibility exists as between the driving element 12 and the pinion 29, the inflexibility referred to being such as does not permit movement of one element without a related and predetermined movement of the other as would occur if, for example, a clutch or other like mechanism were located in the train of transmission elements extending between the driving and driven shafts.

In operation, assuming for example, that a constant torque power is applied to the driving shaft 1 in one direction and that the driven shaft 2 is connected to a load on which it is desired to perform work in said direction, the driving element 12 rotates, its teeth 18 progressively engaging the teeth 34 of the driven element 20 causing movement of said driven element in the same direction as that in which the element 12 is moving. If the movement of the element 20 in said direction is purely lateral or angular with respect to the axis of the shaft 2, the pinion 29 moves to produce work in said direction to the order of power applied to the shaft 1, or, in other words, at a mechanical velocity ratio of one to one. When the element 20 moves laterally, the driving element 12, the driven element 20 and the pinion 29 are observed to move as a unit about the axis of rotation of said pinion theoretically producing a power lever arm that is equal to the summation of the length of the radius of the driven element 20 and the distance between the axis of rotation of the element 20 and the axis of rotation of the shaft 2 operating about a fulcrum at the axis of rotation of the pinion 29 on the lever working arm of a length equal to the radius of the pinion 29. The lateral movement of the element 20 compensates for the differential lengths between the lever power and working arms to produce said unitary velocity ratio.

It is well known that, for example, during starting, the load may exert a greater resistance by reason of its inertia and friction. This resistance is transmitted through the pinion 29 to the point of its engagement with the teeth 28 of the element 20 and in a direction momentarily to produce, with the force exerted by the driving element 12 on the driven element 20, parallel forces on opposite sides of the axis of the pinion which resolve themselves in a tendency to positively move the element 20 laterally. Thus, it is to be observed that the tendency of the element 20 to move laterally is directly proportionate to the load or the resistance to work exerted through the shaft 2 and, therefore, that the resultant mechanical ratio changes are in direct proportion to the work to which the driven shaft is directed.

Consequently, there are periods in the operation of the transmission when, in direct response to the load or its resistance, the element 20 moves momentarily in a lateral or angular direction about the axis of the shaft 2 and in a rotatory direction about the axis of the surface 26. During these periods, a single rotation of the driving element 12 in one direction causes the pinion 29 to move producing work in said direction at a mechanical ratio that varies from one to one to one to one plus within the physical limitations of the relation that the teeth 28 bear to the teeth of the pinion 29.

Should, however, the operator desire that the transmission produce a given mechanical advantage, the collar 30 may be operated by the pins 32 to control the rotation of the bearing shoe 21 with reference to the axis of the shaft 2 and, consequently, control the extent of lateral movement of the element 20 during its rotation. Those skilled in the art will appreciate, by intermittently restricting the lateral movement of the element 20, various controlled degrees of mechanical advantage may be obtained to the full capacity of the relation between the teeth 28 and pinion 29. If the collar 30 is operated to maintain the element 20 from lateral movement during a complete revolution of the driving element 12, the shaft 2 will deliver work at a mechanical advantage of one to one and one-third.

It will be appreciated by those skilled in the art that a power transmission embodying my invention will operate quietly, with little required lubrication and care, and at a high mechanical efficiency, features desirable but found wanting in many of the structures of the prior art. While in accordance with the provisions of the statutes, I have illustrated and described the best form of my invention now known to me, those skilled in the art will readily understand that many changes may be made in the form disclosed without departing from the spirit of my invention as set forth in the appended claims.

I claim:

1. A power transmission interconnecting movable driving and driven members and having a means responsive to the resistance to movement exerted by the driven member to vary the power ratio between the driving and driven members in direct proportion to the increase or decrease of said resistance comprising a rotatable element connected to the driving member, said element having a plurality of teeth, a rotatable gear connected to the driven member, a movable element having a set of teeth adapted to engage the teeth of the element and a second set of teeth adapted to engage the gear teeth, means for movably supporting the second-named element with respect to the first-named element and gear whereby said second-named element is caused to move in direct response to the resistance to rotation exerted by the gear to produce a power ratio between said first-named element and said gear that varies directly with variations in said resistance.

2. A power transmission having a driving element, said driving element having a plurality of alternately disposed arcuate teeth and arcuately shaped lands, an annular element having a plurality of alternately disposed arcuate teeth and arcuately shaped lands, said arcuate teeth having radii of equal length, said arcuately shaped lands having radii of equal length, a driven member, a gear connected to said driven member, said annular element having a second plurality of teeth adapted to engage the teeth of said gear, and means for supporting said annular element for rotation about its own axis and for movement about the axis of the gear whereby a different power ratio exists between the driving element and the driven member when said annular element rotates about its own axis than when it moves about the gear axis.

3. A power transmission having a driving element, said driving element having a plurality of alternately disposed arcuate teeth and arcuately shaped lands, an annular element having a plurality of alternately disposed arcuate teeth and arcuately shaped lands, said arcuate teeth having radii of equal length, said arcuately shaped lands having radii of equal length, a driven member, a gear connected to said driven member, said annular element having a second plurality of teeth adapted to engage the teeth of said gear, a floating bearing for supporting said annular element for rotation about its own axis and for movement about the axis of the gear, and means for defining the movement of said floating bearing to prevent movement of said annular element about the axis of the gear during any desired phase of the rotation of the driving element whereby a desired power ratio between the driving element and driven member may be obtained during said phase different than that obtained during other phases in the rotation of the driving element.

4. A power transmission having a driving element, said driving element having a plurality of alternately disposed arcuate teeth and arcuately shaped lands, an annular element having a plurality of alternately disposed arcuate teeth and arcuately shaped lands, said arcuate teeth having radii of equal length, said arcuately shaped lands having radii of equal length, a driven member, a gear connected to said driven member, said annular element having a second plurality of teeth adapted to engage the teeth of said gear, a floating bearing for supporting said annular element for rotation about its own axis and for movement about the axis of the gear, and an operable means for engaging said bearing to prevent movement of said annular element about the axis of the gear whereby a different power ratio between the driving element and driven member may be obtained during said engagement than when said bearing is disengaged.

5. A power transmission for a driving shaft and a driven shaft, a housing, an element rotatably supported within the housing and connected to the driving shaft, a second rotatable element supported within the housing, intermeshing means carried by each of said elements whereby a single continuous rotation of the driving shaft in one direction will cause a single continuous rotation of the second element in the same direction and a third element engaging the second element and connected to the driven shaft whereby a continuous angular movement in the said direction will be imparted to the driven shaft about its axis upon a continuous angular movement of the driving shaft and the first and second elements each about their own respective axis.

6. A power transmission for a driving shaft and a driven shaft having aligned axes, a housing, an element rotatably supported within the housing and connected to the driving shaft, the said element having a plurality of teeth, a second rotatable element supported within the housing in nesting relation to the first element and having an axis of rotation extending parallel to the axis of the driving shaft and being free to rotate about said last-named axis, the said second element having a plurality of teeth adapted to mesh with the said teeth of the first element whereby a single continuous rotation of the first element about its axis in one direction will cause a single continuous rotation of the second element about its axis in the same direction and a third element engaged by the said second element and connected to the driven shaft whereby a single continuous rotation in the said direction will be imparted to the driven shaft upon a single continuous rotation of the driving shaft and the first and second elements all about the axis of the driving shaft.

7. A power transmission for interconnecting a pair of movable members whereby the movement of one of said members will cause movement of the second of said members and including a pair of rotatable elements, means operatively connecting said first member to one of said elements whereby the movement of said first member will cause rotation of said first element, positive intermeshing means carried by each of said elements, said intermeshing means of each of said elements periodically and successively intermeshing with the intermeshing means of the other element during rotation of one element at an angular velocity to cause rotation of the other element at the same angular velocity, and means operatively connecting the second of said elements to the second member whereby the rotation of the second element will cause movement of the second member.

8. A power transmission for interconnecting a pair of movable members whereby the movement of one of said members will cause movement of the second of said members and including a pair of rotatable elements, means operatively connecting said first member to one of said elements whereby the movement of said first member will cause rotation of said first element, positive intermeshing means carried by each of said elements comprising a plurality of teeth, each tooth of the intermeshing means of each element periodically engaging the same tooth of the other element during each successive rotation of one element at an angular velocity to cause rotation of the other element at the same angular velocity and means operatively connecting the second of said elements to the second member whereby the rotation of the second element will cause rotation of the second member.

9. A power transmission for interconnecting a pair of movable members whereby the movement of one of said members will cause movement of the second of said members and including a pair of rotatable elements, means operatively connecting the first member to one of said elements whereby movement of said first member will cause rotation of the first element, the second of said elements supported for rotatory movements about its own axis and for angular movements with respect to the axis of rotation of said first element, positive intermeshing means carried by each of said elements, said intermeshing means of the first element periodically and successively intermeshing with the intermeshing means of the second element during rotation of the first element to cause at one time rotatory movements of the second element at the same angular velocity at which the first element rotates and at another time to cause angular movements of the second element at the same angular velocity at which the first element rotates, and means operatively connecting said second element to said second member whereby the movement of the second element will cause movement of the second member.

10. A power transmission for interconnecting a pair of movable members whereby the movement of one of said members will cause movement of the second of said members and including a pair of rotatable elements, means operatively connecting the first member to one of said elements whereby movement of said first member will cause rotation of the first element, the second of said elements supported for rotatory movements with respect to the axis of rotation of said first element, positive intermeshing means carried by each of said elements, said intermeshing means of the first element periodically and successively intermeshing with the intermeshing means of the second element during rotation of the first element to cause at one time rotatory movements of the second element at the same angular velocity at which the first element rotates and at another time to cause angular movements of the second element at the same angular velocity at which the first element rotates, an operable means for restricting the movement of the second element to one of said movements, and means operatively connecting said second element to said second member whereby the movement of the second element will cause movement of the second member.

11. A power transmission for interconnecting a pair of movable members whereby the movement of one of said members will cause movement of the second of said members and including a pair of elements, each of said elements supported for rotation about its own central axis, means operatively connecting said first member to one of said elements whereby the movement of said first member will cause rotation of first element about its central axis, positive intermeshing means carried by each of said elements, said intermeshing means of each of said elements periodically and successively intermeshing with the intermeshing means of the other element during the rotation of one element about its central axis at an angular velocity to cause rotation of the other element about its central axis at the same angular velocity, and means operatively connecting the second of said elements to the second member whereby the rotation of the second element about its own axis will cause movement of the second member.

WILLIAM W. ZAENGER.